United States Patent
Cho et al.

(10) Patent No.: US 8,090,012 B2
(45) Date of Patent: Jan. 3, 2012

(54) APPARATUS AND METHOD FOR TRANSMITTING/RECEIVING CHANNEL QUALITY INFORMATION IN A COMMUNICATION SYSTEM

(75) Inventors: Jae-Hee Cho, Seoul (KR); Soon-Young Yoon, Seoul (KR); Jae-Hwan Chang, Suwon-si (KR); Ji-Ho Jang, Seoul (KR); Pan-Yuh Joo, Seoul (KR); Jang-Hoon Yang, Seongnam-si (KR); Joong-Ho Jeong, Seoul (KR); Kwan-Hee Roh, Suwon-si (KR); Sang-Hoon Sung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 189 days.

(21) Appl. No.: 12/543,861

(22) Filed: Aug. 19, 2009

(65) Prior Publication Data

US 2009/0303900 A1     Dec. 10, 2009

Related U.S. Application Data

(63) Continuation of application No. 11/326,160, filed on Jan. 5, 2006, now Pat. No. 7,602,843.

(30) Foreign Application Priority Data

Jan. 5, 2005    (KR) .................... 2005-998
Mar. 4, 2005    (KR) .................. 2005-18372

(51) Int. Cl.
*H04B 3/46*    (2006.01)
(52) U.S. Cl. ................... 375/228; 375/220
(58) Field of Classification Search .......... 375/228, 375/220, 222, 260
See application file for complete search history.

(56) References Cited

U.S. PATENT DOCUMENTS

| | | | |
|---|---|---|---|
| 6,925,341 | B1 | 8/2005 | Yamada |
| 7,164,669 | B2 | 1/2007 | Li et al. |
| 7,412,242 | B2 | 8/2008 | Cho et al. |
| 7,548,752 | B2 | 6/2009 | Sampath et al. |
| 7,602,843 | B2 * | 10/2009 | Cho et al. ............. 375/228 |
| 7,640,373 | B2 | 12/2009 | Cudak et al. |
| 2002/0019233 | A1 * | 2/2002 | Leung et al. ............. 455/447 |

(Continued)

FOREIGN PATENT DOCUMENTS

JP      2001-359152      12/2001

(Continued)

OTHER PUBLICATIONS

Seokhyun Yoon et al., "System Level Performance of OFDMA Forward Link with Proportional Fair Scheduling", PIMCR 2004, 15th IEEE International Symposium, Sep. 8, 2004.

(Continued)

*Primary Examiner* — Emmanuel Bayard
(74) *Attorney, Agent, or Firm* — The Farrell Law Firm, P.C.

(57) ABSTRACT

An apparatus and method for transmitting and receiving Channel Quality Information (CQI) in a communication system. A Base Station (BS) transmits, to a Subscriber Station (SS), a request for CQI of a resource region corresponding to a frequency reuse factor K, which is designated by the BS. The BS then receives, from the SS, the CQI of the resource region corresponding to a channel quality measured by the SS. The channel quality is measured by the SS by measuring a boosted reference signal and compensating the boosted reference signal for a non-boosted signal.

24 Claims, 7 Drawing Sheets

U.S. PATENT DOCUMENTS

| | | | |
|---|---|---|---|
| 2003/0148770 A1* | 8/2003 | Das et al. | 455/455 |
| 2004/0190640 A1 | 9/2004 | Dubuc et al. | |
| 2005/0197129 A1 | 9/2005 | Cho et al. | |
| 2005/0201477 A1 | 9/2005 | Cho et al. | |
| 2005/0289256 A1* | 12/2005 | Cudak et al. | 710/62 |
| 2006/0014542 A1 | 1/2006 | Khandekar et al. | |
| 2006/0083210 A1 | 4/2006 | Li et al. | |
| 2008/0137562 A1* | 6/2008 | Li et al. | 370/280 |

FOREIGN PATENT DOCUMENTS

| | | |
|---|---|---|
| JP | 2004-529524 | 9/2004 |
| JP | 2004-529527 | 9/2004 |
| JP | 2005-502218 | 1/2005 |
| JP | 2006-524969 | 11/2006 |
| JP | 2007-525926 | 9/2007 |
| JP | 2007-532048 | 11/2007 |
| JP | 2007-532057 | 11/2007 |
| JP | 2008-507215 | 3/2008 |
| JP | 2008-526125 | 7/2008 |
| RU | 2 236 757 | 9/2004 |
| RU | 2 237 975 | 10/2004 |
| WO | WO 02/49305 | 6/2002 |
| WO | WO 02/078211 | 10/2002 |
| WO | WO 2004/098072 | 11/2004 |

OTHER PUBLICATIONS

Hoon Kim et al., "Optimal Subchannel Allocation Scheme in Multicell OFDMA Systems", Vehicular Technology Conference, May 17, 2004.

Jaehee Cho et al., "Corrections for CINR Measurement", C80216e-05_162r1, Mar. 12, 2005.

Jaehee Cho et al., "CINR and Preferred-MCS Reports for OFDMA PHY", C80216e-05_299, Jun. 9, 2005.

Jaehee Cho et al., "CINR Reports for OFDMA PHY", C80216e-05_299r1, Jun. 9, 2005.

Jaehee Cho et al., "CINR Reports for OFDMA PHY", C80216e-05_299r2, Jun. 13, 2005.

Inseok Hwang et al., "A New Frame Structure for Scalable OFDMA Systems", Mar. 11, 2004.

* cited by examiner

APPARATUS AND METHOD FOR TRANSMITTING/RECEIVING CHANNEL QUALITY INFORMATION IN A COMMUNICATION SYSTEM

PRIORITY

This application is continuation of U.S. patent application Ser. No. 11/326,160, filed Jan. 5, 2006, now U.S. Pat. No. 7,602,843 and claims priority under 35 U.S.C. §119(a) to applications filed in the Korean Intellectual Property Office on Jan. 5, 2005 and assigned Serial No. 2005-998, and on Mar. 4, 2005 and assigned Serial No. 2005-18372, the entire contents of which are incorporated herein by reference.

BACKGROUND OF THE INVENTION

1. Field of the Invention

The present invention relates generally to a communication system using an Orthogonal Frequency Division Multiple Access (OFDMA) scheme (hereinafter referred to as an "OFDMA" communication system), and in particular, to an apparatus and method for transmitting/receiving channel quality information in an OFDMA communication system using multiple frequency reuse factors.

2. Description of the Related Art

Active research on a $4^{th}$ generation (4G) communication system, which is the next generation communication system, is being conducted to provide users with services having various qualities-of-service (QoS) at a high data rate. Currently, the 4 G communication system is being developed as a new communication system that guarantees mobility and QoS for a wireless Local Area Network (LAN) system and a wireless Metropolitan Area Network (MAN) system, both of which guarantee a higher data rate, thereby to support high-speed services.

A system that employs an Orthogonal Frequency Division Multiplexing (OFDM) scheme or an OFDMA scheme to support a broadband transmission network for physical channels of the wireless MAN system is defined as a communication system based on the Institute of Electrical and Electronics Engineers (IEEE) 802.16 standard (hereinafter referred to as IEEE 802.16 communication system). The IEEE 802.16 communication system, which applies the OFDM/OFDMA schemes to the wireless MAN system, can support high-speed data transmission by transmitting physical channel signals using multiple subcarriers.

A communication system having a cellular structure (hereinafter referred to as a "cellular communication system") may suffer inter-cell interference (ICI) because a plurality of cells constituting the cellular communication system can commonly use the limited resources, i.e., the limited frequency resources, code resources, time slot resources, etc. The IEEE 802.16 communication system is a typical cellular communication system.

In the IEEE 802.16 communication system, if multiple cells share the frequency resources, system performance deteriorates due to the ICI. In some cases, however, the frequency resources are reused in order to increase the total capacity of the IEEE 802.16 communication system. A ratio of the reused frequency resources is referred to as a "frequency reuse factor," and a frequency reuse factor K is defined as an operation of repeatedly using the same frequency resource, or frequency band, for every K cells/sectors. As a result, the frequency reuse factor is determined according to the number of cells/sectors that do not use the same frequency resource.

A concept of the frequency reuse factor will now be described with reference to the diagram of FIG. 1, which illustrates a frequency reuse concept in a cellular communication system. Referring to FIG. 1, a frequency F1 used in a cell with radius R is reused in another cell with radius R.

FIG. 2 is a diagram schematically illustrating a resource allocation method based on multiple frequency reuse factors in a conventional IEEE 802.16 communication system. Referring to FIG. 2, a cell center 201 located in the vicinity of a base station (BS) allocates a resource with K=1 to a subscriber station (SS) because it has a higher carrier-to-interference and noise ratio (CINR). On the contrary, a cell boundary 203 located farther from the BS allocates a resource with K>1 to the SS because it has a lower CINR. In this manner, the BS (or upper node) uses a different frequency reuse factor according to a channel state in the process of allocating a resource to the SS, thereby increasing resource efficiency.

FIG. 3 is a graph illustrating a relationship between a distance from a BS and a CINR separately for K=1 and K>1 in an IEEE 802.16 communication system. Referring to FIG. 3, for K>1, frequency efficiency is higher at the cell boundary.

Therefore, in the IEEE 802.16 communication system, a BS uses the frame in which a frequency reuse factor '1' and a frequency reuse factor 'K' coexist, in order to provide smooth service or safely transmit important information such as control information to an SS located in the cell boundary.

FIG. 4 is a diagram illustrating a format of an OFDMA-based frame in an IEEE 802.16 communication system. Referring to FIG. 4, an OFDMA frame includes subchannel allocation regions having various subchannel allocation schemes. That is, the OFDMA frame includes a Partial Usage of Subchannels (PUSC) allocation region, a Full Usage of Subchannels (FUSC) allocation region, an Optional FUSC allocation region, and a Band Adaptive Modulation & Coding (Band AMC) allocation region.

The allocation region is a variable region, a length of which is changeable by a BS. For the change in the allocation region, the BS broadcasts a downlink MAP (DL-MAP) to SSs to inform the SSs of the change in the allocation region. The BS always uses a frequency reuse factor '1' for the FUSC and Optional FUSC allocation regions, and uses a frequency reuse factor '1' or 'N' for PUSC and Band AMC allocation regions.

The IEEE 802.16 communication system uses various schemes, in particular an Adaptive Modulation and Coding (AMC) scheme, in order to support high-speed data transmission. The AMC scheme refers to a data transmission scheme that determines a different modulation scheme and coding scheme according to a channel state between a cell, or BS, and an SS, thereby improving the total efficiency of the cell. The AMC scheme has a plurality of modulation schemes and a plurality of coding schemes, and modulates/codes channel signals with a combination of the modulation schemes and the coding schemes.

Commonly, each of the combinations of the modulation schemes and the coding schemes is referred to as a Modulation and Coding Scheme (MCS), and a plurality of MCSs with a level #1 to a level #N can be defined according to the number of the MCSs. That is, the AMC scheme adaptively determines a level of the MCS according to a channel state between the BS and the SS, thereby improving the total system efficiency. Therefore, a scheduler of the BS must be aware of Channel Quality Information (CQI) for each of SSs. To this end, the SS measures its channel state and reports an associated CQI to the BS, and the BS determines an MCS level for the corresponding SS taking the reported CQI into account. However, if the CQI reported from the SS is incorrect, the BS may allocate an inappropriate MCS level, causing a loss of radio resources and a reduction in system performance.

Generally, there are two possible methods for feeding back a CQI from an SS to a BS in the IEEE 802.16 communication system. One method feeds back the CQI using messages defined in a Medium Access Control (MAC) layer, for example, Report-Request (REP-REQ) and Report-Response (REP-RSP) messages, and another method feeds back the CQI using a Channel Quality Indicator Channel (CQICH) defined in a physical layer. The names of the messages and/or channels are subject to change.

In a method of transmitting/receiving a CQI in the MAC layer, the BS transmits a REP-REQ message for requesting a CQI report to an SS, and the SS transmits a REP-RSP message to the BS to report a measured CQI. Herein, the REP-RSP message may be used as an unsolicited message.

In a method of transmitting/receiving a CQI in the physical layer, the BS transmits a CQICH allocation Information Element (IE) message to each of SSs to allocate a dedicated CQI channel, and the SS reports a CQI using the allocated dedicated CQI channel. Herein, the CQI can be a CINR.

The SS can report a CQI by measuring channel quality for either a particular subchannel or a reference signal in a frame.

In the former case where the SS measures channel quality for a particular subchannel, the SS can report a correct CQI, in which even the interference (or loading) from neighboring cells or sectors is reflected. However, for the channel quality measurement, the SS must process a data signal for the particular subchannel, causing an increase in calculation required by the SS to acquire the data signal.

On the contrary, in the latter case where the SS measures channel quality using its known reference signal, the SS can reduce calculation required for the channel quality measurement. In this case, however, the SS cannot report a CQI, in which even the interference (or loading) from neighboring cells or sectors is reflected. Therefore, the SS reports an equivalent CQI measured for the maximum possible interference (loading). The term "equivalent CQI" refers to a CQI measured in such a manner that an SS measures strength of a boosted reference signal, and subtracts the boosted value from the strength of the reference signal when reporting a CQI. The reference signal can be a preamble or pilot signal.

SUMMARY OF THE INVENTION

The IEEE 802.16 communication system, an SS feeds back only one measured CQI, i.e., one measured CINR value to a BS through a REP-RSP message or a dedicated CQI channel, for all the cases where the SS is allocated a subchannel, except for the case where the SS is allocated a Band AMC subchannel. Therefore, the BS has no way to determine whether the CINR value reported from the SS is for a frequency reuse factor '1' or a frequency reuse factor 'K' which is positive integer greater than one.

As the frequency reuse factor increases, the BS receives a CQI having a higher CINR value from the SS. For example, if the SS reports a CINR value for a frequency reuse factor '1' in the state where a frequency reuse factor for a subchannel actually allocated to the SS is 'K', the reported CINR value is lower than an actual CINR value. In this case, even though the SS can be allocated an MCS level having higher modulation order and coding rate and perform communication at a higher data rate, it receives a service at a lower data rate due to the report of the incorrectly measured CINR. This wastes radio resources.

On the contrary, if the SS reports a CINR value for a frequency reuse factor 'K' in the state where a frequency reuse factor for a subchannel actually allocated to the SS is '1', the reported CINR value is higher than an actual CINR value. In this case, the SS reports less interference than actual interference, increasing a transmission error probability. As a result, in order for the BS to effectively utilize the AMC scheme, it is preferable that the SS report a CQI for each of the individual subchannels corresponding to different frequency reuse factors, existing in a frame. However, such a scheme is not disclosed in IEEE 802.16 standard. In addition, the IEEE 802.16 standard has not defined how the BS could determine whether the SS reports a CQI for a particular subchannel or an equivalent CQI.

It is, therefore, an object of the present invention to provide an apparatus and method for efficiently allocating radio resources in an IEEE 802.16 communication system.

It is another object of the present invention to provide an SS apparatus and method for reporting CQIs for the subchannels corresponding to different frequency reuse factors in an IEEE 802.16 communication system.

It is further another object of the present invention to provide an apparatus and method for transmitting/receiving a CQI including information indicating whether interference from neighboring cells or sectors is reflected in the CQI, in an IEEE 802.16 communication system.

According to an aspect of the present invention, there is provided a method for transmitting Channel Quality Information (CQI) by a Subscriber Station (SS) in a communication system. The method includes: receiving, from a Base Station (BS), a request for CQI of a resource region corresponding to a frequency reuse factor K, which is designated by the BS; measuring, by the SS, channel quality of the resource region corresponding to the frequency reuse factor K, in response to the request for CQI, by measuring a boosted reference signal and compensating the boosted reference signal for a non-boosted signal; and transmitting, to the BS, the CQI of the resource region corresponding to the measured channel quality.

According to another aspect of the present invention, there is provided a method for receiving Channel Quality Information (CQI) by a Base Station (BS) in a communication system. The method includes: transmitting, to a Subscriber Station (SS), a request for CQI of a resource region corresponding to a frequency reuse factor K, which is designated by the BS; and receiving, from the SS, the CQI of the resource region corresponding to a channel quality measured by the SS. The channel quality is measured by measuring a boosted reference signal and compensating the boosted reference signal for a non-boosted signal.

According to another aspect of the present invention, there is provided an apparatus for transmitting Channel Quality Information (CQI) in a Subscriber Station (SS) of a communication system. The apparatus includes: a receiver for receiving, from a Base Station (BS), a request for CQI of a resource region corresponding to a frequency reuse factor K, which is designated by the BS; a channel quality measurer for measuring channel quality for the resource region corresponding to the frequency reuse factor K by measuring a boosted reference signal and compensating the boosted reference signal for a non-boosted signal; and a transmission unit for transmitting the CQI of the resource region corresponding to the measured channel quality to the BS.

According to another aspect of the present invention, there is provided an apparatus for receiving Channel Quality Information (CQI) in a Base Station (BS) of a communication system. The apparatus includes: a scheduler for transmitting, to a Subscriber Station (SS), a request for CQI of a resource region corresponding to a frequency reuse factor K, which is designated by the BS; and a receiver for receiving, from the SS, the CQI of the resource region corresponding to a channel quality measured by the SS and providing the CQI of the resource region to the scheduler to be used for performing scheduling. The channel quality is measured by measuring a boosted reference signal and compensating the boosted reference signal for a non-boosted signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Figure 1:
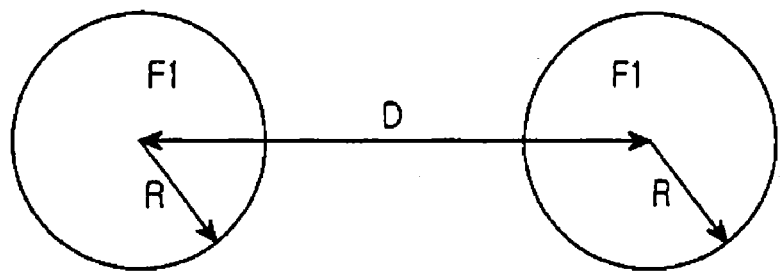
FIG. 1 is a diagram illustrating a frequency reuse concept in a cellular communication system.
Figure 2:
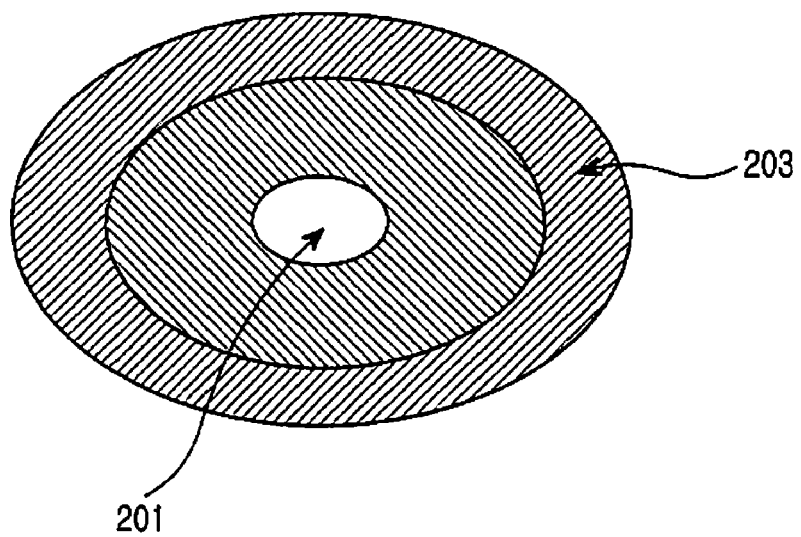
FIG. 2 is a diagram schematically illustrating a resource allocation method based on multiple frequency reuse factors in a conventional IEEE 802.16 communication system.
Figure 3:
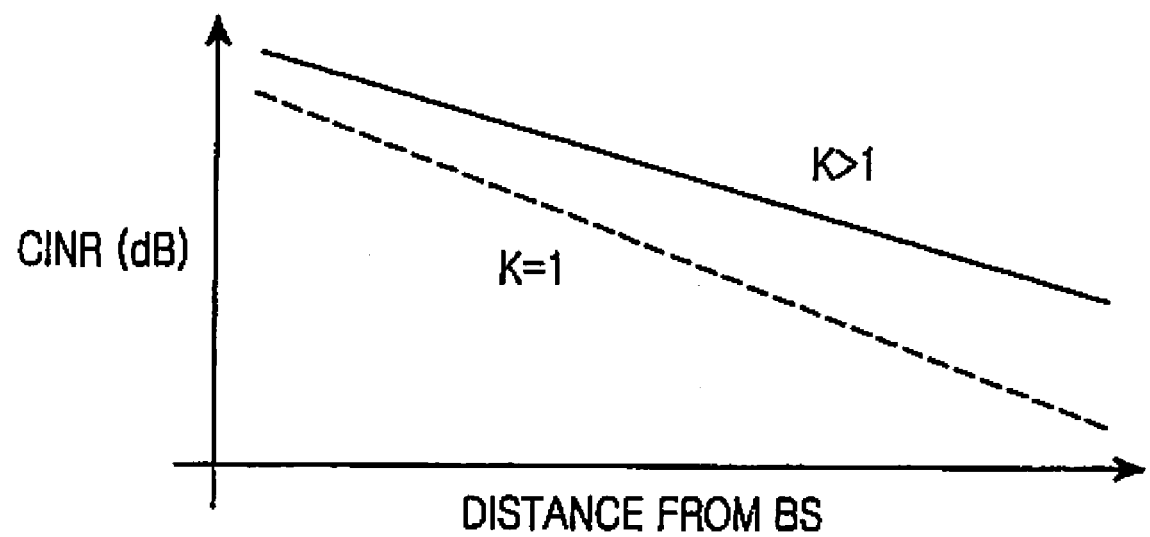
FIG. 3 is a graph illustrating a relationship between a distance from a BS and a CINR separately for K=1 and K>1 in an IEEE 802.16 communication system.
Figure 4:
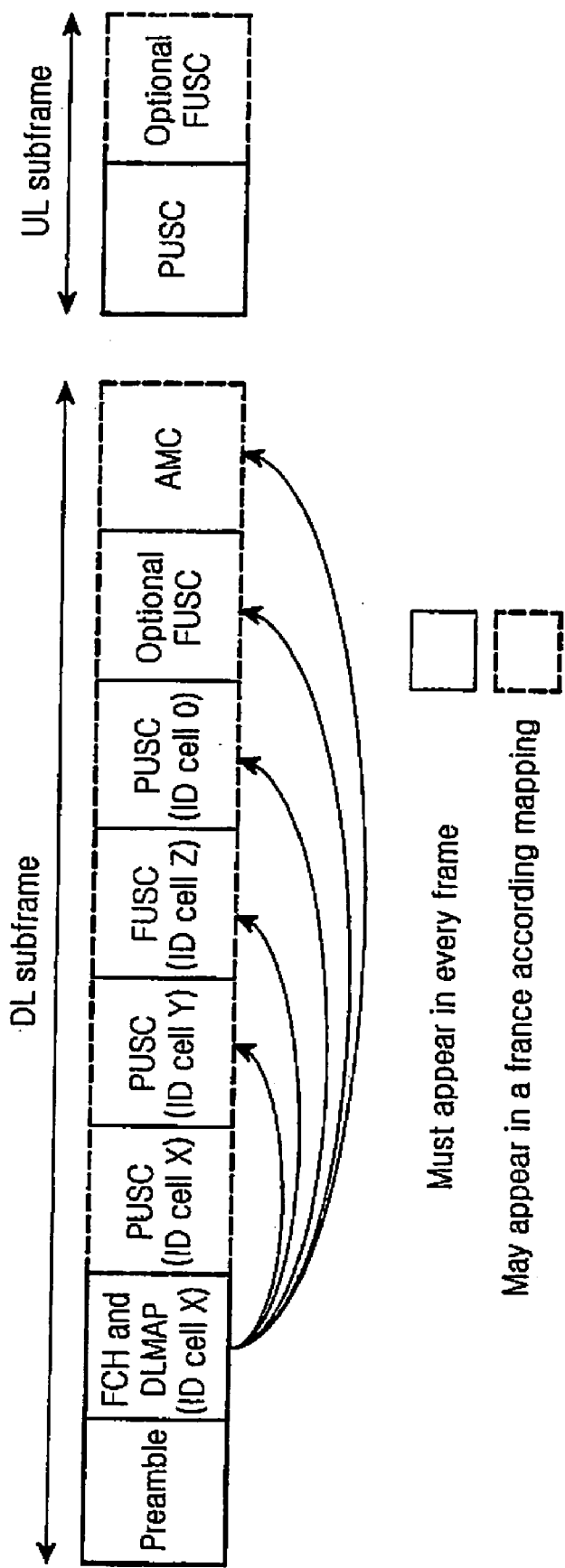
FIG. 4 is a diagram illustrating a format of an OFDMA-based frame in an IEEE 802.16 communication system.

Preferred embodiments of the present invention will now be described in detail with reference to the annexed drawings. In the following description, a detailed description of known functions and configurations incorporated herein has been omitted for clarity and conciseness.

In a communication system using an Orthogonal Frequency Division Multiple Access (OFDMA) scheme (hereinafter referred to as an "OFDMA communication system") according to the present invention, a base station (BS) transmits a newly defined Report-Request (REP-REQ) message for requesting channel quality information (CQI) to a subscriber station (SS), and the SS transmits a CQI to the BS using a newly defined Report-Response (REP-RSP) message. The CQI can be a carrier-to-interference and noise ratio (CINR) or a received signal strength indicator (RSSI). It will be assumed herein that the CQI is a CINR.

The REP-REQ message is a message used for instructing a CQI report for each of individual subchannels corresponding to different frequency reuse factors, in one frame, and the REP-RSP message is a message used for recording therein a CINR value for each of individual subchannels, measured in response to the CQI report instruction in the REP-REQ message. In addition, the REP-RSP message includes information indicating whether the SS has taken into account the interference from neighboring cells or sectors. That is, the SS can report a CQI by either measuring the channel quality for subchannels in a downlink frame, or measuring the channel quality (equivalent CQI) using reference signals (i.e., preamble or pilot signals). The term "equivalent CQI" refers to a CQI measured in such a manner that an SS measures strength of a boosted reference signal, and subtracts the boosted value from the strength of the reference signal when reporting a CQI. The reference signal can be a preamble or pilot signal.

In this manner, even though the BS requests transmission of a CQI for each individual subchannel or frequency reuse factor, the SS measures the channel quality according to its own selected CQI measurement method, includes information indicating whether it has taken into account interference from neighboring cells or sectors in the REP-RSP message, and transmits the REP-RSP message to the BS. The BS can perform efficient scheduling by receiving the REP-RSP message including the information (hereinafter referred to as a "cell loading indicator") indicating whether the interference is taken into account.

Embodiments of the present invention will be described herein below with reference to an Institute of Electrical and Electronics Engineers (IEEE) 802.16 communication system, one of the typical OFDMA communication systems.

The present invention can define the following three possible embodiments for a frequency reuse factor-based CQI transmission/reception scheme.

In a first embodiment, a BS transmits to an SS a REP-REQ message so as to instruct the SS to report a CQI for some or all of individual subchannel fields existing in a downlink frame. Upon receiving the REP-REQ message, the SS can report either CQIs or equivalent CQIs, measured for some or all of the individual subchannel fields existing in the downlink frame. Of course, the REP-REQ message always includes cell loading indicator information.

In a second embodiment, a BS transmits to an SS a REP-REQ message so as to instruct the SS to classify subchannels instead of individual CQIs for subchannels existing in a downlink frame according to frequency reuse factors '1' and 'K' which is positive integer greater than one and report some or all of CQIs for the individual frequency reuse factors. Upon receiving the REP-REQ message, the SS reports some or all of CQIs or equivalent CQIs for the subchannels with the frequency reuse factors of '1' or 'K', by transmitting the REP-RSP message to the BS.

In a third embodiment, a BS requests an SS to send a CQI report for a subchannel corresponding to a particular frequency reuse factor, and the SS reports a CQI or an equivalent CQI for the subchannel corresponding to the particular frequency reuse factor, in response to the request from the BS.

Figure 5:
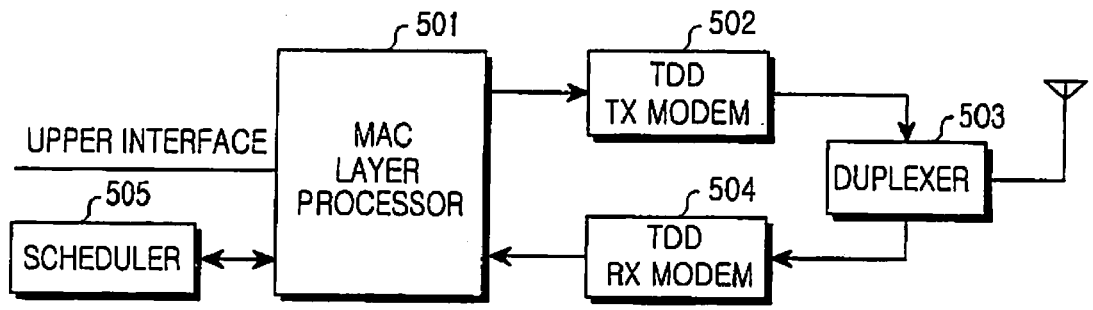
FIG. 5 is a block diagram illustrating a structure of a BS apparatus for instructing a CQI report in an IEEE 802.16 communication system according to embodiments of the present invention.

With reference to FIG. 5, a description will now be made of a structure of a BS in an IEEE 802.16 communication system according to the present invention. FIG. 5 is a block diagram illustrating a structure of a BS apparatus for instructing a CQI report in an IEEE 802.16 communication system.

Referring to FIG. 5, a BS includes a Medium Access Control (MAC) layer processor 501 for generating and analyzing data and a MAC message, a Time Division Duplexing (TDD) transmission modem 502 for TDD-modulating/demodulating the data and the MAC message generated by the MAC layer processor 501 before transmitting them to an SS, a TDD reception modem 504 for TDD-modulating/demodulating data and a MAC message received from the SS, a duplexer 503 for duplexing signals transmitted/received via an antenna, and a scheduler 505, connected to the MAC layer processor 501, for scheduling the SS.

The scheduler 505 determines a frequency reuse factor for an SS according to an operation environment, and instructs a CQI report for the determined frequency reuse factor by transmitting a REP-REQ message to the SS. Information included in the REP-REQ message is subject to change according to first through third embodiments of the present invention.

Figure 6:
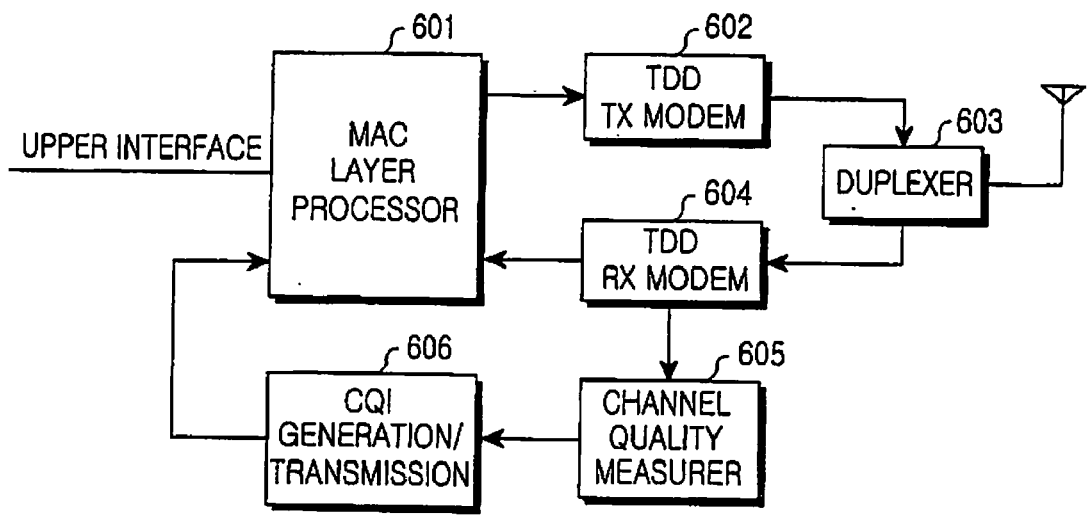
FIG. 6 is a block diagram illustrating a structure of an SS apparatus for measuring and reporting a CQI in an IEEE 802.16 communication system according to the present invention.

FIG. 6 is a block diagram illustrating a structure of an SS apparatus for measuring and reporting a CQI in an IEEE 802.16 communication system according to the present invention.

Referring to FIG. 6, an SS includes a MAC layer processor 601 for generating and analyzing data and a MAC message, a TDD transmission modem 602 for TDD-modulating/demodulating the data and the MAC message generated by the MAC layer processor 601 before transmitting them to a BS, a TDD reception modem 604 for TDD-modulating/demodulating data and a MAC message received from the BS, a duplexer 603 for duplexing signals transmitted/received via an antenna, a channel quality measurer 605 for measuring downlink channel quality, and a CQI generation/transmission unit 606 for generating a coded value for a measured channel quality value to be transmitted through a REP-RSP message or a dedicated CQI channel in order to transmit the measured channel quality to the BS.

The channel quality measurer 605 either measures channel quality for subchannels designated by a BS or subchannels for a particular frequency reuse factor, or measures channel quality for preambles. The CQI generation/transmission unit 606 generates a REP-RSP message that is mapped to the measured channel quality and can be uniquely set according to each individual embodiment, or encodes a measured channel quality value to be transmitted through a dedicated CQI channel, and outputs the result to the MAC layer processor 601.

A description will now be made of the REP-REQ message and the REP-RSP message that are uniquely set according to each individual embodiment. The conventional REP-REQ and REP-RSP messages are specified in IEEE 802.16-REVd/D5, and the present invention proposes new REP-REQ and REP-RSP messages shown in Table 1 through Table 6 by partially modifying the conventional REP-REQ and REP-RSP messages. With the use of the newly proposed messages, a BS and an SS can transmit/receive a CQI in a channel environment in which multiple frequency reuse factors are used.

First Embodiment

Table 1 below shows Type Length Value (TLV) parameters in a REP-REQ message according to a first embodiment of the present invention, in which the length is expressed in bytes.

TABLE 1

| Name | Type | Length | Value |
|------|------|--------|-------|
| Channel Type Request | 1.3 | 1 | Bit #0 = 1: Report the (equivalent) estimation of CINR in PUSC region with frequency reuse factor = 3, Bit #1 = 1: Report the (equivalent) estimation of CINR in PUSC region with frequency reuse factor = 1, Bit #2 = 1: Report the (equivalent) estimation of CINR in FUSC region, Bit #3 = 1: Report the (equivalent) estimation of CINR in Optional FUSC region, Bit #4 = 1: Report the (equivalent) estimation of CINR in Band AMC Channel region, Bit #5 = 1: Report the (equivalent) estimation of CINR in Safety Channel region, Bit #6 = 1: Reserved, Bit #7: AAS CINR measurement indicator: When the last bit of Channel Type request is '0' the CINR measurement directed by Bit #4 shall be done for the symbols that are not beamformed. Otherwise, the CINR measurement directed by Bit #4 shall be done for the symbols that are beamformed. |

As described above, in the first embodiment, a BS transmits to an SS a REP-REQ message so as to instruct the SS to report a CQI for some or all of individual subchannel regions existing in a downlink frame. Upon receiving the REP-REQ message, the SS can either report CQIs measured for some or all of the individual subchannel regions existing in the downlink frame, or report measured equivalent CQIs.

Therefore, the BS determines bitmap values of a Channel Type Request field in the REP-REQ message shown in Table 1, and transmits the resultant REP-REQ message to the SS.

Upon receiving the REP-REQ message, the SS measures either CINRs for subchannels designated by the BS or CINRs (or equivalent CINRs) for preambles, and reports the measured CINRs to the BS through a REP-RSP message shown in Table 2 or a dedicated CQI channel.

Table 2 below shows a REP-RSP message, which is a response message to the REP-REQ message, according to the first embodiment of the present invention.

TABLE 2

| Channel Type Request | Name | Type | Length | Value |
|---|---|---|---|---|
| Bit #0 = 1 | PUSC region with frequency reuse factor = 3 | 2.1 | 1 | Bit #0~4: The (equivalent) estimation of CINR in PUSC region with frequency reuse factor = 3, Bit #5, 6: reserved, Bit #7: Cell loading indicator: '0' - it is assumed that the region is fully loaded. '1' - the cell loading is reflected in the estimation. |
| Bit #1 = 1 | PUSC region with frequency reuse factor = 1 | 2.2 | 1 | Bit #0~4: The (equivalent) estimation of CINR in PUSC region with frequency reuse factor = 1, Bit #5, 6: reserved, |

TABLE 2-continued

| Channel Type Request | Name | Type | Length | Value |
|---|---|---|---|---|
| | | | | Bit #7: Cell loading indicator: '0' - it is assumed that the region is fully loaded. '1' - the cell loading is reflected in the estimation. |
| Bit #2 = 1 | FUSC region | 2.3 | 1 | Bit #0~4: The (equivalent) estimation of CINR in FUSC region, Bit #5, 6: reserved, Bit #7: Cell loading indicator: '0' - it is assumed that the region is fully loaded. '1' - the cell loading is reflected in the estimation. |
| Bit #3 = 1 | Optional FUSC region | 2.4 | 1 | Bit #0~4: The (equivalent) estimation of CINR in the Optional FUSC region, Bit #5, 6: reserved, Bit #7: Cell loading indicator: '0' - it is assumed that the region is fully loaded. '1' - the cell loading is reflected in the estimation. |
| Bit #4 = 1 | Band AMC Channel | 2.5 | 5 | First 12 bits for the band indicating bitmap and next 25 bits for CINR reports (5 bits per each band). When the 8th bit of Channel Type Request is '0' the CINR measurement shall be done for the symbols that are not beamformed. Otherwise, the CINR measurement shall be done for the symbols that are beamformed. Bit #37, 38: reserved, Bit #39: Cell loading indicator: '0' - it is assumed that the region is fully loaded. '1' - the cell loading is reflected in the estimation. |
| Bit #5 = 1 | Safety Channel | 2.6 | 5 | The first 20 bits for the reported bin indices and the next 20 bits for CINR reports (5 bits for each bin). |

Upon detecting a CQI report request for subchannel regions through the REP-REQ message received from the BS, the SS measures CQIs or equivalent CQIs for the corresponding subchannels, and transmits the REP-RSP message, shown in Table 2, including the measured CQI values recorded therein, to the BS. A particular bit in the REP-RSP message represents a cell loading indicator. When a value of the particular bit is '0', it means an equivalent CQI report indicating that interference (loading) from neighboring cells or sectors was not taken into consideration, on the assumption that the current interference is equal to the maximum interference. On the contrary, however, when a value of the particular bit is '1', it means a CQI report for some or all of the subchannel regions, in which interference from neighboring cells or sectors was taken into account. The cell loading indicator is included even in REP-RSP messages used in the second and third embodiments described below.

The SS can transmit a CQI using a dedicated CQI channel instead of the REP-REQ message. To this end, the BS allocates a plurality of dedicated CQI channels to the SS by transmitting the existing CQICH allocation IE a predetermined number of times, and the SS reports CINR values for a plurality of subchannels or preambles using the plurality of the allocated dedicated CQI channels. In this case, the SS follows a CQI report method designated in the last transmitted REP-RSP message. If the number of CQIs transmitted through the last transmitted REP-RSP message is greater than the number, Q which is positive integer, of the currently allocated CQI channels, a CQI report method of reporting the first Q CQIs transmitted through the REP-RSP message is applied to the currently allocated CQI channels. This can be applied in the same way even to the second and third embodiments.

Second Embodiment

Table 3 below shows TLV parameters in a REP-REQ message according to a second embodiment of the present invention, in which the length is expressed in bytes.

TABLE 3

| Name | Type | Length | Value |
|---|---|---|---|
| Channel Type Request | 1.3 | 1 | Bit #0: CINR for reuse 1 configuration Bit #1: CINR for reuse K configuration Bit #2: CINR for Band AMC Zone Bit #3: CINR of Safety Channel Bit #4~6: reserved. Bit #7: AAS CINR measurement indicator: When the last bit of Channel Type Request is '0' the CINR measurement directed by Bit #4 shall be done for the symbols that are not beamformed. Otherwise, the CINR |

TABLE 3-continued

| Name | Type | Length | Value |
|------|------|--------|-------|
|      |      |        | measurement directed by Bit #4 shall be done for the symbols that are beamformed. |

As described above, in the second embodiment, a BS instructs an SS to report CQIs for subchannels associated with frequency reuse factors '1' and 'K', and the SS measures CQIs or equivalent CQIs for the subchannels associated with the frequency reuse factors '1' and 'K', and reports the measured CQIs to the BS. Therefore, compared with the first embodiment, the second embodiment can reduce message overhead.

The BS determines bitmap values of a Channel Type Request field in the REP-REQ message shown in Table 3, and transmits the resultant REP-REQ message to the SS. For example, if the BS determines a bitmap value as Bit #0=1, the SS can measure CQIs or equivalent CQIs for subchannels corresponding to a frequency reuse factor '1', and report the measured CQIs. Therefore, upon receiving the REP-REQ message, the SS measures CQIs or equivalent CQIs for subchannels associated with frequency reuse factors '1' and 'K' designated by the BS, and reports the measured CQIs (or CINRs) to the BS through the REP-RSP message shown in Table 4, or a dedicated CQI channel.

Table 4 below shows a REP-RSP message, which is a response message to the REP-REQ message, according to the second embodiment of the present invention.

Upon detecting a CQI report request for subchannel regions associated with frequency reuse factors '1' and 'K' from the BS, the SS measures CQIs or equivalent CQIs for the corresponding subchannels, and transmits the REP-RSP message, shown in Table 4, including the measured CQI or equivalent CQI values recorded therein, to the BS. 'K' is positive integer greater than one.

Third Embodiment

Table 5 below shows TLV parameters in a REP-REQ message according to a third embodiment of the present invention, in which the length is expressed in bytes.

TABLE 5

| Name | Type | Length | Value |
|------|------|--------|-------|
| Channel Type Request | 1.3 | 1 | 000 = Normal subchannel with frequency reuse factor = 1 configuration, 001 = Normal subchannel with frequency reuse factor = K configuration (K is positive integer greater than one), 010 = -Band AMC Channel 011 = Safety Channel, Bit #3~6: reserved. Bit #7: AAS CINR measurement indicator: When the last bit of Channel Type Request is '0' the CINR measurement directed by Bit #4 |

TABLE 4

| Channel Type Request | Name | Type | Length | Value |
|---|---|---|---|---|
| Bit #0 = 1 | CINR for reuse 1 configuration | 2.1 | 1 | First 5 bits for the CINR measurement report for reuse 1 configuration, Bit #5, 6: reserved, Bit #7: Cell loading indicator: '0' - it is assumed that the region is fully loaded. '1' - the cell loading is reflected in the estimation. |
| Bit #1 = 1 | CINR for reuse K configuration | 2.2 | 1 | First 5 bits for the CINR measurement report for reuse K configuration Bit #5, 6: reserved, Bit #7: Cell loading indicator: '0' - it is assumed that the region is fully loaded. '1' - the cell loading is reflected in the estimation. |
| Bit #2 = 1 | CINR of Band AMC Zone | 2.3 | 5 | First 12 bits for the band indicating bitmap and next 25 bits for CINR reports (5 bits per each band). When the 8th bit of Channel Type Request is '0' the CINR measurement shall be done for the symbols that are not beamformed. Otherwise, the CINR measurement shall be done for the symbols that are beamformed. Bit #37, 38: reserved, Bit #39: Cell loading indicator: '0' - it is assumed that the region is fully loaded. '1' - the cell loading is reflected in the estimation. |
| Bit #3 = 1 | CINR of Safety Channel | 2.4 | 5 | The first 20 bits for the reported bin indices and the next 20 bits for CINR reports (5 bits for each bin). |

TABLE 5-continued

| Name | Type | Length | Value |
|------|------|--------|-------|
| | | | shall be done for the symbols that are not beamformed. Otherwise, the CINR measurement directed by Bit #4 shall be done for the symbols that are beamformed. |

As described above, in the third embodiment, a BS can allocate subchannels associated with one frequency reuse factor for an individual SS according to an operation environment. Therefore, the BS can instruct the SS to report only the CQIs for the subchannels associated with a particular frequency reuse factor. Also, in the third embodiment, the SS may transmit equivalent CQIs. Therefore, compared with the first and second embodiments, the third embodiment can further reduce the message overhead.

The BS determines a frequency reuse factor for an SS and transmits the resultant information through the REP-REQ message shown in Table 5, at initial access of the SS or when necessary. For example, if the BS sets the Channel Type Request field in the REP-REQ message to '000', the SS measures only the CQIs or equivalent CQIs for the subchannels associated with the frequency reuse factor '1', and reports the measured CQIs to the BS. In this case, the SS reports the measured CQIs or equivalent CQIs to the BS through the REP-RSP message shown in Table 6, or a dedicated CQI channel.

Table 6 below shows a REP-RSP message, which is a response message to the REP-REQ message, according to the third embodiment of the present invention, in which the length is expressed in bytes.

TABLE 6

| Channel Type Request | Name | Type | Length | Value |
|---|---|---|---|---|
| 000 | CINR for reuse 1 configuration | 2.1 | 1 | First 5 bits for the CINR measurement report for reuse 1 configuration, Bit #5, 6: reserved, Bit #7: Cell loading indicator: '0' - it is assumed that the region is fully loaded. '1' - the cell loading is reflected in the estimation. |
| 001 | CINR for reuse K configuration | 2.2 | 1 | First 5 bits for the CINR measurement report for reuse K configuration, Bit #5, 6: reserved, Bit #7: Cell loading indicator: '0' - it is assumed that the region is fully loaded. '1' - the cell loading is reflected in the estimation. |
| 010 | CINR of Band AMC Zone | 2.3 | 5 | First 12 bits for the band indicating bitmap and next 25 bits for CINR reports (5 bits per each band). When the 8th bit of Channel Type request is '0' the CINR measurement shall be done for the symbols that are not beamformed. Otherwise, the CINR measurement shall be done for the symbols that are beamformed. Bit #37, 38: reserved, Bit #39: Cell loading indicator: '0' - it is assumed that the |

TABLE 6-continued

| Channel Type Request | Name | Type | Length | Value |
|---|---|---|---|---|
| | | | | region is fully loaded. '1' - the cell loading is reflected in the estimation. |
| 011 | CINR of Safety Channel | 2.4 | 5 | The first 20 bits for the reported bin indices and the next 20 bits for CINR reports (5 bits for each bin). |

Upon detecting a report request, received from the BS, for CQIs or equivalent CQIs for subchannels associated with a particular frequency reuse factor among subchannel regions associated with a frequency reuse factors '1' and 'K', the SS measures CQIs or equivalent CQIs for subchannels associated with the corresponding frequency reuse factor, and transmits the REP-RSP message, shown in Table 6, including the measured CQI values recorded therein, to the BS. Regarding the difference between the third embodiment and the second embodiment, while the second embodiment allows the SS to transmit CQIs for all subchannels associated with the frequency reuse factors '1' and 'K', the third embodiment allows the SS to measure the CINRs and report the measured CINRs when it is allocated subchannels associated with a frequency reuse factor allocated thereto, i.e., subchannels associated with the frequency reuse factor '1'. Therefore, compared with the first and second embodiments, the third embodiment minimizes the message overhead.

Figure 7:
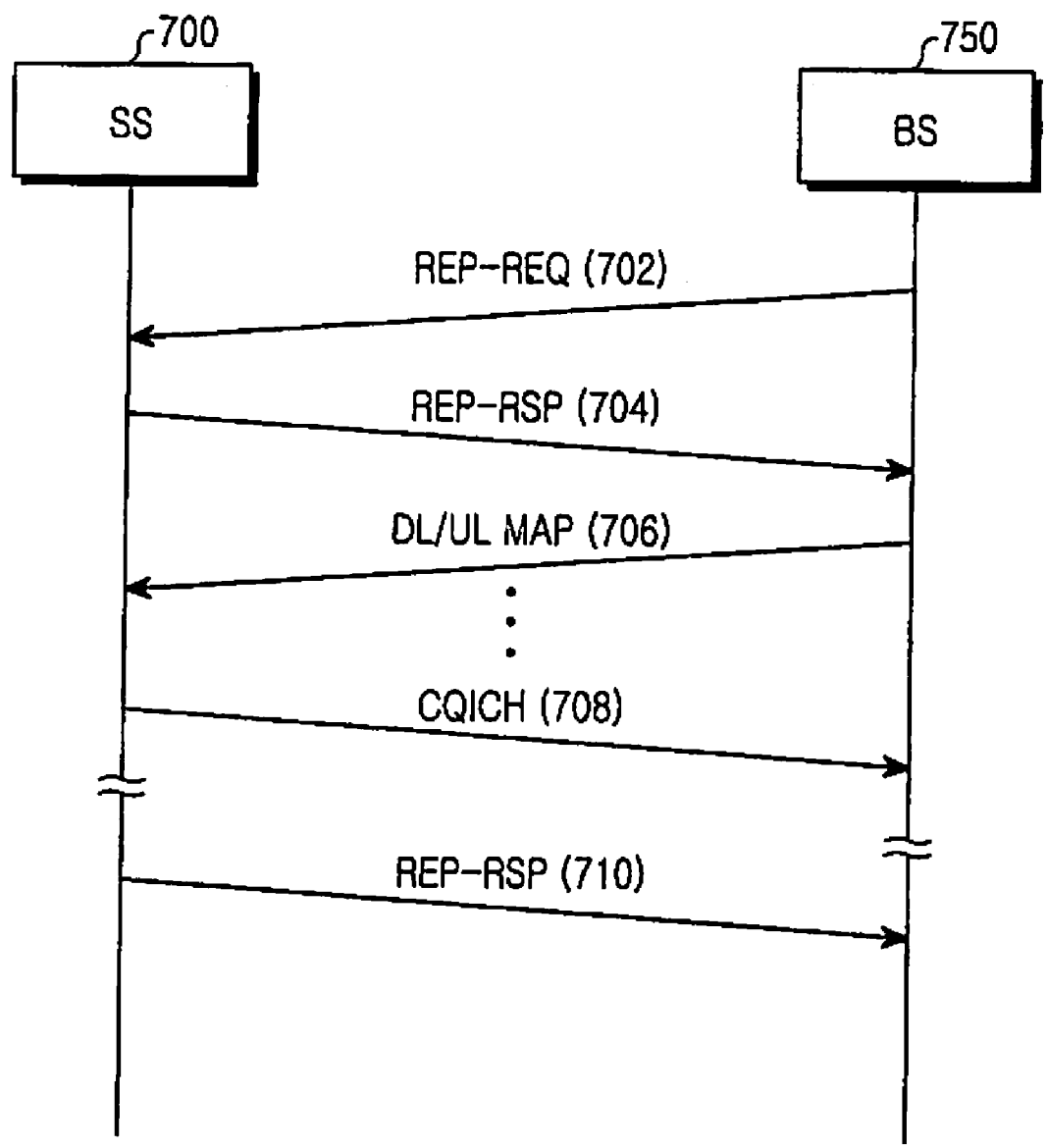
FIG. 7 is a signaling diagram illustrating a signal transmission/reception process according to the present invention.

With reference to FIG. 7, a description will now be made of a CQI transmission/reception signaling process according to the present invention. FIG. 7 is a signaling diagram illustrating a signal transmission/reception process according to the present invention.

Referring to FIG. 7, a BS 750 transmits a REP-REQ message for requesting channel quality measurement to an SS 700 in step 702. The REP-REQ message differs according to embodiments, and one of the formats shown in Table 1, Table 3 and Table 5 can be used for the REP-REQ message. The SS 700 transmits a REP-RSP message in response to the REP-REQ message in step 704. The REP-RSP message corresponds to the REP-REQ message, and one of the formats shown in Table 2, Table 4 and Table 6 can be used for the REP-RSP message.

Steps 702 and 704 represent a process of transmitting CQIs using the REP-REQ and REP-RSP messages defined in a MAC layer. Alternatively, it is also possible to transmit the CQIs using a dedicated CQI channel defined in a physical layer.

That is, the BS 750 allocates a dedicated CQI channel to the SS 700 through a DL/UL-MAP of a downlink frame in step 706. The SS 700 reports a CQI to the BS 750 using the dedicated CQI channel allocated in a CQI report method designated in the last transmitted REP-RSP message in step 708.

In another possible case, the SS 700 reports a CQI using an unsolicited REP-RSP message in step 710. The BS 750 detects a CQI report method by receiving the unsolicited REP-RSP message.

Figure 8:
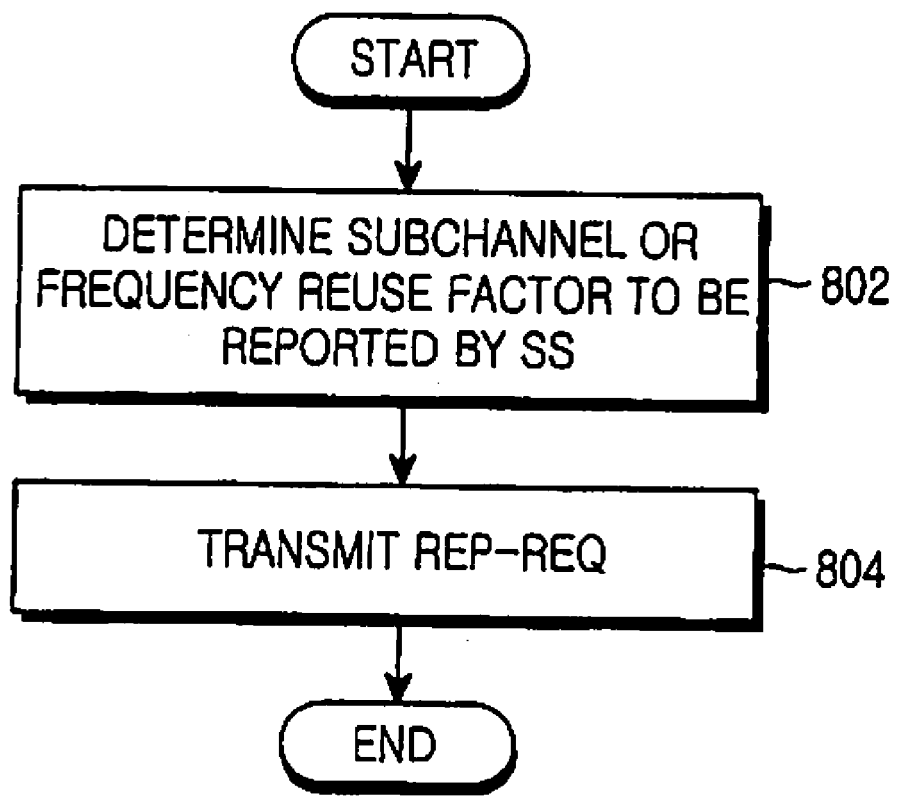
FIG. 8 is a flowchart illustrating a BS's operation according to the present invention.

FIG. 8 is a flowchart illustrating a BS's operation according to the third embodiment of the present invention. Referring to FIG. 8, in step 802, a BS determines a subchannel or a frequency reuse factor, for which an SS will send a CQI report, according an operation environment. In step 804, the BS transmits a REP-REQ message to the SS to request a CQI report for the subchannel associated with the determined frequency reuse factor.

Figure 9:
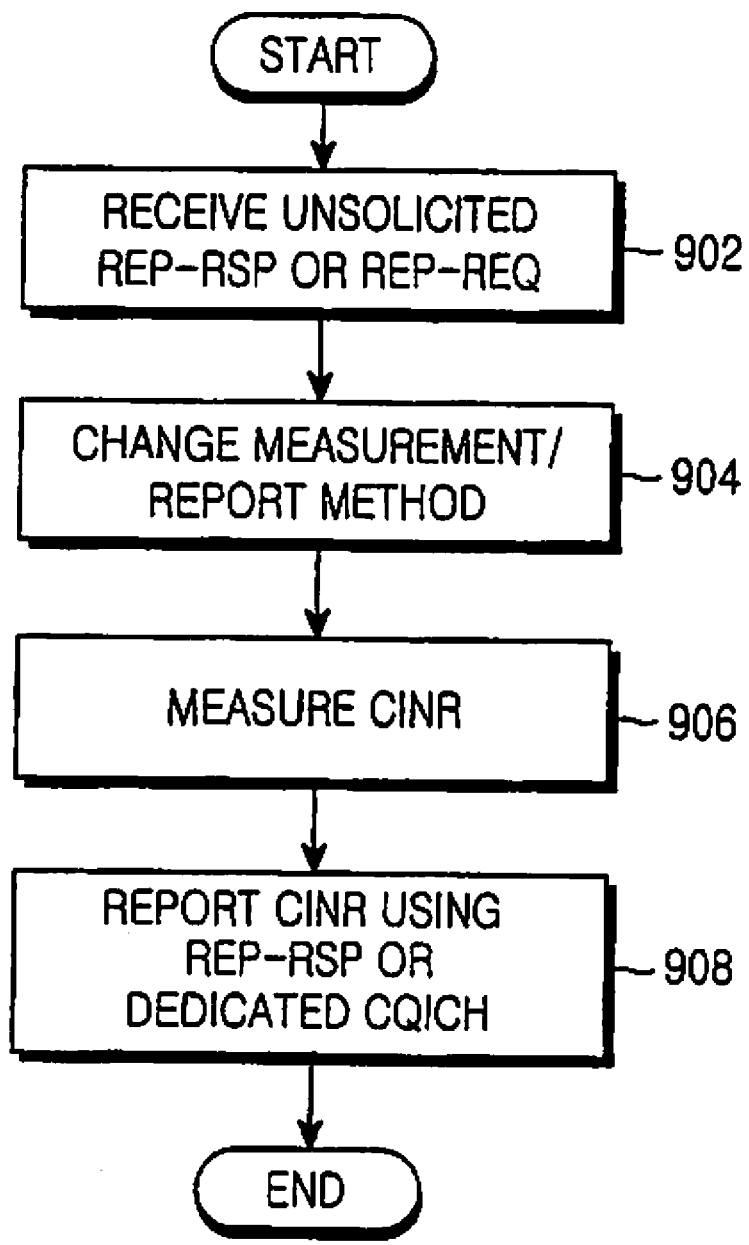
FIG. 9 is a flowchart illustrating an SS's operation according to the present invention.

FIG. 9 is a flowchart illustrating an SS's operation according to the third embodiment of the present invention. Referring to FIG. 9, in step 902, an SS receives a transmission command for an unsolicited REP-RSP message from an upper layer, or receives a REP-REQ message from a BS. In step 904, the SS changes information on subchannels to be measured according to a measurement/report method indicated by the BS or determined by the upper layer of the BS. In step 906, the SS measures CINRs for the subchannels established in step 904, or CINRs for preambles. In step 908, the SS reports the measured CINRs to the BS using a REP-RSP message or a dedicated CQI channel. The REP-RSP message can include cell loading indicator information indicating whether interference (loading) from neighboring cells or sectors was reflected in the reported CQIs.

As can be understood from the foregoing description, the present invention efficiently transmits/receives CQIs using the newly defined REP-REQ and REP-RSP messages in the OFDMA communication system, making it possible to correctly transmit/receive CQIs for individual subchannels corresponding to different frequency reuse factors. As a result, the BS can effectively apply the AMC scheme to the SS, contributing to an increase in the total transmission efficiency and resource management efficiency of the system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting Channel Quality Information (CQI) by a Subscriber Station (SS) in a communication system, the method comprising:
    receiving, from a Base Station (BS), a request for CQI of a resource region corresponding to a frequency reuse factor K, which is designated by the BS;
    measuring, by the SS, channel quality of the resource region corresponding to the frequency reuse factor K, in response to the request for CQI, by measuring a boosted reference signal; and
    transmitting, to the BS, the CQI of the resource region corresponding to the measured channel quality.

2. The method of claim 1, wherein the channel quality is measured as a Carrier-to-Interference and Noise Ratio (CINR) measured from a preamble signal or a specific subchannel region.

3. The method of claim 1, wherein the frequency reuse factor K is a positive integer, and is defined such that one frequency band is repeatedly used in K cells.

4. The method of claim 1, wherein the request for the CQI of the resource region includes a bit value for instructing the SS to report a Carrier-to-Interference and Noise Ratio (CINR) measured from a preamble signal for one of frequency reuse factor K=1 and frequency reuse factor K=3.

5. The method of claim 1, wherein the communication system utilizes frames, each of the frames including at least one allocation region, and
    wherein a frequency reuse factor is individually set in each of the at least one allocation region.

6. The method of claim 1, wherein the resource region includes one of a preamble region, a Partial Usage of SubChannels (PUSC) allocation region, a Full Usage of SubChannels (FUSC) allocation region, an optional FUSC allocation region, and a Band Adaptive Modulation & Coding (Band AMC) allocation region.

7. A method for receiving Channel Quality Information (CQI) by a Base Station (BS) in a communication system, the method comprising:
    transmitting, to a Subscriber Station (SS), a request for CQI of a resource region corresponding to a frequency reuse factor K, which is designated by the BS; and
    receiving, from the SS, the CQI of the resource region corresponding to a channel quality measured by the SS,
    wherein the channel quality is measured by measuring a boosted reference signal.

8. The method of claim 7, wherein the channel quality is measured as a Carrier-to-Interference and Noise Ratio (CINR) measured from a preamble signal or a specific subchannel region.

9. The method of claim 7, wherein the frequency reuse factor K is a positive integer, and is defined such that one frequency band is repeatedly used in K cells.

10. The method of claim 7, wherein the request for CQI includes a bit value for instructing the SS to report a Carrier-to-Interference and Noise Ratio (CINR) measured from a preamble signal for one of frequency reuse factor K=1 and frequency reuse factor K=3.

11. The method of claim 7, wherein the communication system utilizes frames, each of the frames including at least one allocation region, and
    wherein a frequency reuse factor is individually set in each of the at least one allocation region.

12. The method of claim 7, wherein the resource region includes one of a preamble region, a Partial Usage of SubChannels (PUSC) allocation region, a Full Usage of SubChannels (FUSC) allocation region, an optional FUSC allocation region, and a Band Adaptive Modulation & Coding (Band AMC) allocation region.

13. An apparatus for transmitting Channel Quality Information (CQI) in a Subscriber Station (SS) of a communication system, the apparatus comprising:
    a receiver for receiving, from a Base Station (BS), a request for CQI of a resource region corresponding to a frequency reuse factor K, which is designated by the BS;
    a channel quality measurer for measuring channel quality for the resource region corresponding to the frequency reuse factor K by measuring a boosted reference signal; and
    a transmission unit for transmitting the CQI of the resource region corresponding to the measured channel quality to the BS.

14. The apparatus of claim 13, wherein the channel quality is measured as a Carrier-to-Interference and Noise Ratio (CINR) measured from a preamble signal or a specific subchannel region.

15. The apparatus of claim 13, wherein the frequency reuse factor K is a positive integer, and is defined such that one frequency band is repeatedly used in K cells.

16. The apparatus of claim 13, wherein the request for the CQI of the resource region includes a bit value for instructing the SS to report a Carrier-to-Interference and Noise Ratio (CINR) measured from a preamble signal for one of frequency reuse factor K=1 and frequency reuse factor K=3.

17. The apparatus of claim 13, wherein the communication system utilizes frames, each of the frames including at least one allocation region, and
    wherein a frequency reuse factor is individually set in each of the at least one allocation region.

18. The apparatus of claim 13, wherein the resource region is one of a preamble region, a Partial Usage of SubChannels (PUSC) allocation region, a Full Usage of SubChannels (FUSC) allocation region, an optional FUSC allocation region, and a Band Adaptive Modulation & Coding (Band AMC) allocation region.

19. An apparatus for receiving Channel Quality Information (CQI) in a Base Station (BS) of a communication system, the apparatus comprising:
   a scheduler for transmitting, to a Subscriber Station (SS), a request for CQI of a resource region corresponding to a frequency reuse factor K, which is designated by the BS; and
   a receiver for receiving, from the SS, the CQI of the resource region corresponding to a channel quality measured by the SS and providing the CQI of the resource region to the scheduler to be used for performing scheduling,
   wherein the channel quality is measured by measuring a boosted reference signal.

20. The apparatus of claim 19, wherein the channel quality is measured as a Carrier-to-Interference and Noise Ratio (CINR) measured from a preamble signal or a specific subchannel region.

21. The apparatus of claim 19, wherein the frequency reuse factor K is a positive integer, and is defined such that one frequency band is repeatedly used in K cells.

22. The apparatus of claim 19, wherein the request for CQI of the resource region includes a bit value for instructing the SS to report a Carrier-to-Interference and Noise Ratio (CINR) measured from a preamble signal for one of frequency reuse factor K=1 and frequency reuse factor K=3.

23. The apparatus of claim 19, wherein the communication system utilizes frames, each of the frames including at least one region, and
   wherein a frequency reuse factor is individually set in each of the at least one allocation region.

24. The apparatus of claim 19, wherein the resource region comprises one of a preamble region, a Partial Usage of SubChannels (PUSC) allocation region, a Full Usage of SubChannels (FUSC) allocation region, an optional FUSC allocation region, and a Band Adaptive Modulation & Coding (Band AMC) allocation region.

* * * * *